United States Patent [19]

Mikkor

[11] 4,245,012

[45] Jan. 13, 1981

[54] SODIUM SULFUR BATTERY SEAL

[75] Inventor: Mati Mikkor, Ann Arbor, Mich.

[73] Assignee: Ford Motor Company, Dearborn, Mich.

[21] Appl. No.: 70,361

[22] Filed: Aug. 28, 1979

[51] Int. Cl.³ .......................................... H01M 10/39
[52] U.S. Cl. .................................... 429/104; 429/185
[58] Field of Search ............... 429/104, 185, 171, 172

[56] References Cited

U.S. PATENT DOCUMENTS

| 3,939,007 | 2/1976 | Sudworth et al. | 429/104 |
| 4,037,027 | 7/1977 | Desplanches et al. | 429/104 |
| 4,084,048 | 4/1978 | King | 429/185 |
| 4,169,919 | 10/1979 | Topouzizan | 429/104 |

Primary Examiner—Donald L. Walton

Attorney, Agent, or Firm—William E. Johnson; Olin B. Johnson

[57] ABSTRACT

This disclosure is directed to an improvement in a sodium sulfur battery construction in which a seal between various battery compartments is made by a structure in which a soft metal seal member is held in a sealing position by holding structure. A pressure applying structure is used to apply pressure on the soft metal seal member when it is being held in sealing relationship to a surface of a container member of the sodium sulfur battery by the holding structure. The improvement comprises including a thin, well-adhered, soft metal layer on the surface of the container member of the sodium sulfur battery to which the soft metal seal member is to be bonded.

3 Claims, 2 Drawing Figures

SODIUM SULFUR BATTERY SEAL

STATEMENT

The invention herein described was made in the course of or under a contract or subcontract thereunder with the Department of Energy--Contract No. DE-AT02-79ET25105.

BACKGROUND OF THE INVENTION AND PRIOR ART STATEMENT

This invention is directed to an improved seal for a sodium sulfur battery. For example, the improved seal could be an improvement over the seals shown in U.S. patent application Ser. No. 954,966 filed Oct. 26, 1978, now Patent 4,169,919 to A. Topouzian for a "Double Seal for Sodium Sulfur Battery", or the seal disclosed in U.S. patent application Ser. No. 954,967 filed Oct. 26, 1978 to A. Topouzian et al for a "Seal for Sodium Sulfur Battery." Both of the above-mentioned patent applications are assigned to the Ford Motor Company and are hereby incorporated by reference. In the seals shown in both applications, a common denominator is the use of a soft metal seal member which is deformed by a pressure applying device into sealing contact with a surface of the various container elements of the battery to form a seal.

U.S. patent application Ser. No. 956,758 filed Nov. 1, 1978 to A. Topouzian for a "Sodium Sulfur Battery Seal" is assigned to the Ford Motor Company. That application is also hereby incorporated by reference. That application discloses flexible diaphragm seal members in sealing contact with a ceramic, ring-shaped member defining a portion of a container of a sodium sulfur battery. The specification of the application teaches that the ceramic ring, if used in an as-sintered condition, is coated with a thin coating of a soft metal to a thickness which provides a smooth surface against which an interference fit may be made by the flexible diaphragm seals which are to engage the same.

SUMMARY OF THE INVENTION

This invention relates to an improved seal for a sodium sulfur battery and, more particularly, to an improved seal in which the principal sealing element is a deformable soft metal element.

In accordance with the specific teachings of the structure of this invention, the improvement comes about in a sodium sulfur battery construction in which a seal between various battery compartments is made by a structure in which a soft metal seal member is held in a sealing position by a holding structure. A pressure applying structure is used to apply pressure on the soft metal seal member when it is being held in sealing relationship to a surface of a container member of the sodium sulfur battery by the holding structure. The improvement taught in this specification is a thin, well-adhered, soft metal layer formed on the surface of the container member of the sodium sulfur battery to which the soft metal seal is being bonded in order to form the seal. The soft metal layer may be formed on either a ceramic or a metallic container member of the battery.

This sealing improvement may be used with soft metal seal members regardless of their particular design. The seal members may be spaced one above the other, or radially from one another, as is taught in the two applications mentioned in the Prior Art portion of this specification.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

DESCRIPTION OF THE PREFERRED EMBODIMENT

While the improved seal of this invention may be used with any sodium sulfur battery seal in which a deformable metal member is used as the sealing structure, the improvement will be illustrated with respect to the double seal for a sodium sulfur battery shown in the previously mentioned U.S. patent application Ser. No. 954,966. This seal structure is illustrated in FIG. 1.

Figure 1:
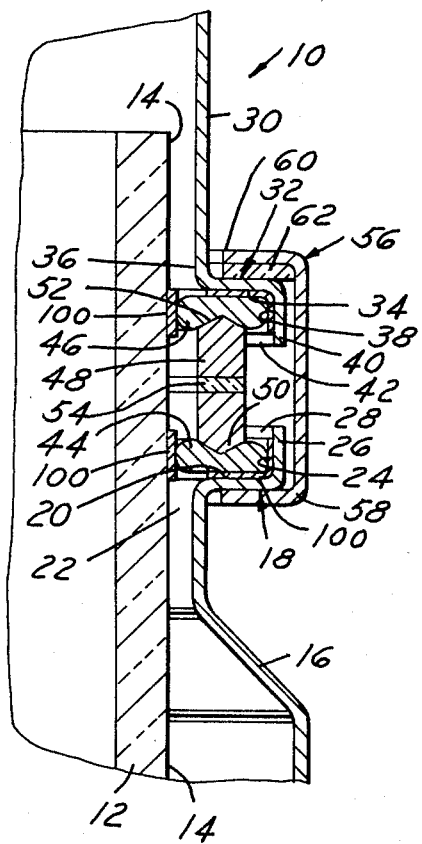
FIG. 1 is a first embodiment of the improved seal structure of this invention.

In FIG. 1, there is seen a sodium sulfur battery generally designated by the numeral 10. This battery has a beta alumina electrolyte closed end tube 12 of circular cross-section, a portion of which is shown in the drawing. This tube 12 has an outer face 14.

A lower can member 16 encircles and is spaced from the outer surface 14 of the tube 12. A portion of the can is shown in FIG. 1. The lower can member 16 has a top portion generally designated by the numeral 18 formed in the shape of a flange. This flange has a flat surface 20 extending outwardly from a position 22 adjacent the outer surface 14 of the tube 12 to an extended position 24 and then upwardly to a terminal position 26 to thereby define a lower circumferential notch 28 adjacent the outer surface 14 of the tube 12.

In a like manner, an upper can member 30 encircles and is spaced from an upper portion of the outer surface 14 of the tube 12. This upper can member 30 has a bottom portion generally designated by the numeral 32 in the shape of a flange. The bottom portion 32 has a flat surface 34 extending outwardly from a position 36 adjacent the outer surface 14 of the tube 12 to an extended position 38 and then downwardly to a terminal position 40 to thereby define a lower circumferential notch 42 adjacent the outer surface 14 of the tube 12.

A soft deformable lower ring element 44, formed from a metal such as aluminum, is received in the lower circumferential notch 28. In a similar manner, a soft deformable upper ring element 46 is received in the upper circumferential notch 42.

An electrically insulated, pressure applying element 48 has a lower pressure applying surface 50 engaging the lower ring element 44, and an upper pressure applying surface 52 engaging the upper ring element 46. The electrically insulated and pressure applying element 48 has the pressure applying portions thereof made of hard metallic material with a central electrical insulating material 54 located therebetween.

A pressure applying device generally designated by the numeral 56 takes the form of a "C" shaped metal band which is clamped around the entire circumferential portions of the top portion 18 of the lower can member 16 and the bottom portion 32 of the can member 30 to apply pressure thereon and cause the seals to be formed.

A lower leg 58 of the pressure applying device 56 is received under the outwardly extending flat surface 20 of the top portion 18 of the lower can member 16. In a similar manner, an upper leg 60 of the pressure applying device 56 is received over the outwardly extending flat surface 34 of the bottom portion 32 of the upper can member 30. A band of electrical insulating material 62 is positioned between the upper leg 60 and the flat surface 34.

In accordance with the teachings of this invention, a thin, well-adhered, soft metal layer 100—100, shown in very enlarged section in the drawing in order to depict the same, is also used in the seal structure between the lower ring element 44 and upper ring element 46 and the associated areas to which these ring elements are sealed to the outer surface 14 of the tube 12 and to the associated surfaces of the lower can member 16 and the upper can member 30. The metal selected may be any soft metal suitable for such an application. The preferred metal used is aluminum.

In accordance with a preferred embodiment of the improved seal of this invention, those places on both the can member and the ceramic member which are to be in juxtaposition to the sealing rings 44 and 46 are coated with an aluminum coating having a thickness of 0.001 inches to 0.010 inches in any one of a number of ways. One suitable way of doing so is to ion diffusion bond aluminum into the areas desired. Alternate methods would be to sputter aluminum on a relatively clean oxide free surface. In a similar manner, the aluminum layer can be sputtered onto a ceramic part in the area which will be engaged to define a seal.

After all the above-identified structure has been assembled, and the coated seal areas 100—100 are in association with the ring elements 44 and 46, the pressure applying device 56 is clamped onto and formed about the assembly in a manner which generates a clamping pressure between the top portion 18 of the lower can member 16 and the bottom portion 32 of the upper can member 30. This clamping pressure is sufficient so that the lower pressure applying surface 50 and the upper pressure applying surface 52 of the electrically insulated and pressure applying element 48 deforms respectively the lower ring element 44 and the upper ring element 46 in their respective circumferential notches.

These ring elements 44 and 46 are deformed in a manner which causes them to flow into sealing engagement with the seal surfaces 100 placed on the various portions of the container defining elements. A more comprehensive explanation of the exact manner in which the elements are assembled and the rings deformed is set forth in the aforementioned patent application Ser. No. 954,966.

Figure 2:
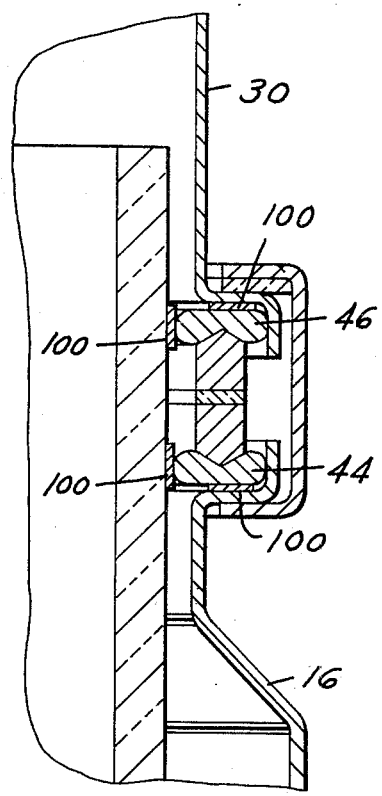
FIG. 2 is an alternate embodiment of the improved seal structure of this invention.

The embodiment of the seal structure shown in FIG. 2 is different from that shown in FIG. 1 in that the sealing area 100—100 between the lower can member 16 and the sealing ring 44, and the upper can member 30 and its associated ring member 46, are reduced in total area. In the case shown in FIG. 2, the sealing areas 100—100 extend only along the flat surface 20 of the top portion 18 of the lower can member 16, and the bottom portion 30 of the upper can member 30.

By providing the seal areas 100, the final compression seals made using the deformable ring members 44 and 46 are improved over those seals formed without such seal areas. For example, cold welding of an aluminum surface to an aluminum surface forms a good metallurigical bond. This bond is more easily accomplished and the seals formed thereby are hermetic and capable of thermal cycling between room temperature and temperatures commonly used in operation of sodium sulfur cells (300° C. to 400° C.).

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. In a sodium sulfur battery construction which includes:
    a container member,
    a soft metal seal member,
    a holding structure for holding said soft metal seal member in a sealing position with respect to said container member, and
    a pressure applying structure for applying pressure on said soft seal member to seal said soft seal member to said container member while said soft seal member is being held by said holding structure, the improvement comprising:
    a thin, well-adhered soft metal layer formed on the surface of the said container member of the sodium sulfur battery to which said soft metal seal member is sealed.

2. The improved sodium sulfur battery seal of claim 1 in which a thin, well-adhered, soft metal layer is formed on a container member made of a ceramic material.

3. The improved sodium sulfur battery seal of claim 1 in which a thin, well-adhered, soft metal layer is formed on a container member made of a metal material.

* * * * *